United States Patent [19]

Chiappetti

[11] 4,285,279

[45] Aug. 25, 1981

[54] RAILWAY VEHICLE ENERGY PRODUCING SYSTEM

[76] Inventor: Arthur B. Chiappetti, 10600 S. Oakley, Chicago, Ill. 60643

[21] Appl. No.: 42,739

[22] Filed: May 29, 1979

[51] Int. Cl.³ .................... B60L 1/00; B60L 5/00; B61C 17/00
[52] U.S. Cl. .................... 105/118; 105/49; 105/114; 191/59.1
[58] Field of Search .................... 105/49, 114, 118; 191/59.1

[56] References Cited

U.S. PATENT DOCUMENTS

| 502,297 | 8/1893 | Hunter | 105/118 X |
| 659,697 | 10/1900 | Richards et al. | 105/118 |
| 910,211 | 1/1909 | Mann | 105/118 X |
| 1,139,493 | 5/1915 | Creveling | 105/118 |
| 1,188,570 | 6/1916 | Strobel et al. | 105/49 X |
| 1,410,949 | 3/1922 | Negroto | 105/118 |
| 1,639,143 | 8/1927 | McPherson | 105/118 |
| 3,544,802 | 12/1970 | Burrell | 105/49 X |
| 3,786,762 | 6/1974 | Corkum et al. | 191/59.1 |

Primary Examiner—Joseph F. Peters, Jr.
Assistant Examiner—Howard Beltran
Attorney, Agent, or Firm—Bernard L. Kleinke

[57] ABSTRACT

In a vehicular energy producing system including an electrical generating device and being adapted to be mounted on an undercarriage of a heavy vehicle, a support bracket mounted on the undercarriage for supporting the electrical generating device, and a clutch mounted on the undercarriage. The clutch is driven by the rotation of the wheels of the undercarriage to in turn drive the electrical generating device. A transmission drivingly connects the clutch and the generating device.

8 Claims, 4 Drawing Figures

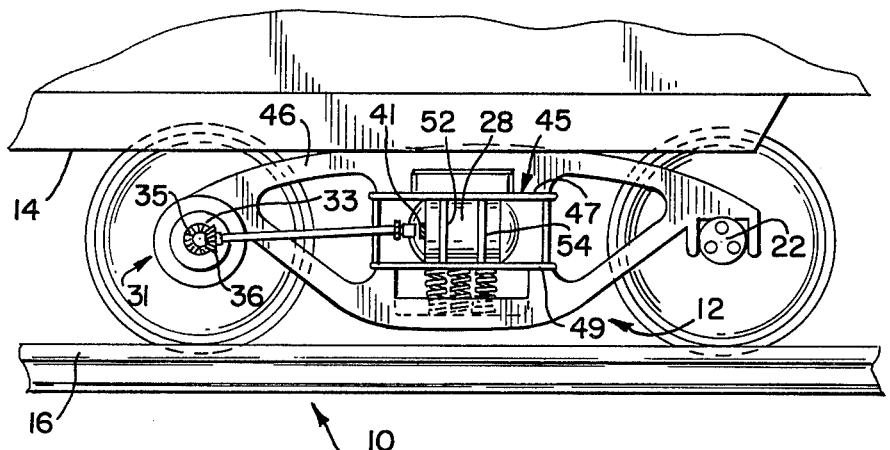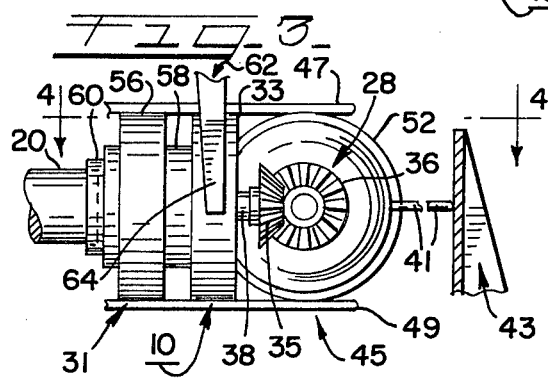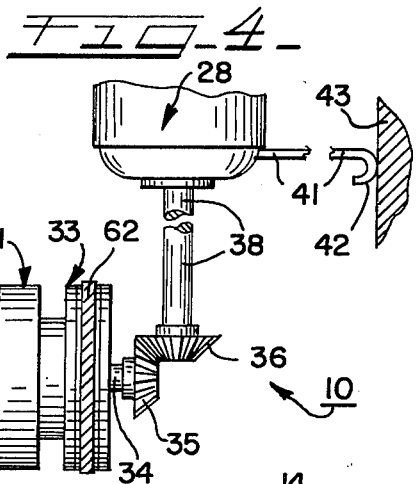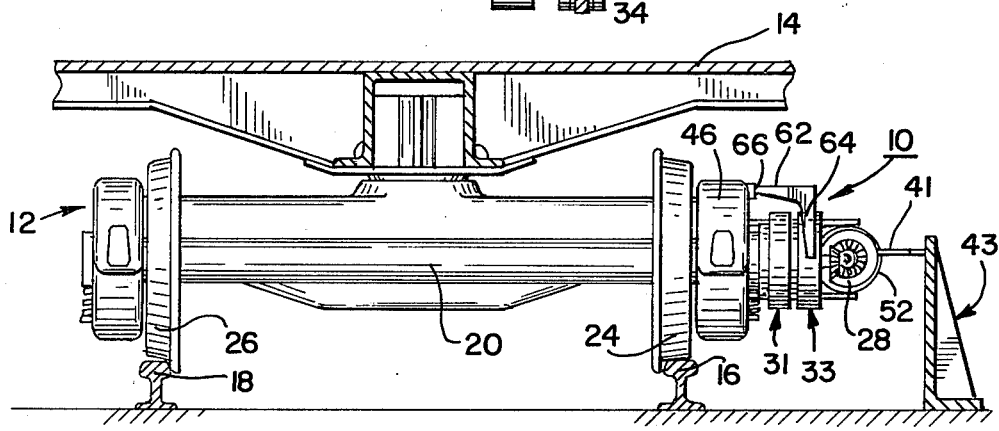

RAILWAY VEHICLE ENERGY PRODUCING SYSTEM

BRIEF SUMMARY OF THE INVENTION

The present invention relates in general to a vehicular energy producing system, and it more particularly relates to such an energy producing system which includes an electrical generating device adapted to be mounted on a heavy vehicle having at least one undercarriage, such heavy vehicles being, for example, a railroad train car.

Present day energy supplies and natural resources are in short supply. Therefore, for the purpose of conserving our natural resources, it is highly desirable to have a new and improved technique for generating power, such as electrical power. Many different types and kinds of arrangements have been employed for driving electrical generators for the production and utilization of electrical energy; however, it would be highly advantageous to have a new low-cost technique for driving an electrical generator or similar device in a new and improved energy saving manner.

Therefore, it is the principal object of the present invention to provide a new and improved energy producing system, which may be used in connection with vehicles.

Briefly, the above and further objects are realized by providing in a vehicular energy producing system including an electrical generating device adapted to be mounted on the undercarriage of a heavy vehicle, a bracket mounted on the undercarriage for supporting the electrical generating device, and a clutch connected drivingly through a transmission to the electrical generating device to the moving undercarriage of the vehicle. In this manner, the clutch operates to drive the generator once the vehicle has achieved a high rate of speed. The speed and momentum of the heavy vehicle are then utilized to drive the electrical generating device.

BRIEF DESCRIPTION OF THE DRAWINGS

The above-mentioned and other objects and features of this invention and the manner of attaining them will become apparent, and the invention itself will be best understood by reference to the following description of the embodiment of the invention taken in conjunction with the accompanying drawings, wherein:

FIG. 1 is an elevational view of the vehicular energy producing system, which is constructed in accordance with the present invention, and which is illustrated and described to be mounted on a railroad train car:

FIG. 2 is a cross-sectional elevational view of the system shown in FIG. 1 of the drawings;

FIG. 3 is a greatly enlarged detail cross-sectional elevational view of the system of FIG. 2; and FIG. 4 is a greatly enlarged detail plan view of the system of FIG. 3 taken substantially along the line 4—4 thereof.

DETAILED DESCRIPTION

Referring now to the drawings and more particularly to FIGS. 1 and 2 thereof, there is shown a vehicular energy-producing system 10, which is constructed in accordance with the principles of the present invention and which is shown mounted on an undercarriage 12 supporting a railroad car 14 on a pair of tracks 16 and 18. The undercarriage 14 includes a pair of parallel spaced-apart axles 20 and 22, which are journaled for rotation and which have wheels mounted at the end portion thereof to rotate therewith. For example, the wheels 24 and 26 are fixed to the end portions of the axle 20 and rollably help support the railroad car 14 on the respective tracks 16 and 18, as best seen in FIG. 2 of the drawings.

The system 10 generally comprises an electrical generator 28 which is mounted on the undercarriage 12 and which is driven by the axle 20 as hereinafter described in greater detail. As best seen in FIGS. 3 and 4 of the drawings, a clutch 31 drivingly connects one end of the axle 20 to the generator 28 via a gear box 33, a stub shaft 34, a pair of bevel gears 35 and 36, and a shaft 38.

In order to utilize the electrical power generated by the electrical generator 28, an elongated brush conductor 41 is connected electrically to the output of the generator 28 and extends transversely therefrom and includes a reversely bent end portion 42, which electrically and movably slides freely along an upright power take-off rail 43, which extends along the ground in a parallel spaced-apart manner outwardly from the rail 16. In this manner, the power take-off rail 43 enables the electrical power generated by the generator 28 to be utilized in any convenient manner, such as by supplying the electrical energy for electric lights or for any other purpose. It should be understood that instead of using the power take-off rail 43, the electrical energy produced by the system 10 may be utilized by the railroad car 14 or the entire train (not shown). In this regard, the electrical energy generated by the system 10 may be used to operate the lighting system or other system onboard the train. Also, as will become apparent to those skilled in the art, the electrical energy produced by the system 10 may also be stored in suitable electric storage batteries carried onboard the train. In this manner, the electrical energy may be transported by the train itself and thereby used subsequently at remote locations.

In use, the system 10 generates electricity when the train car 14 is moving at a higher rate of speed. In this regard, when the train car 14 commences movement along the tracks 16 and 18, the axle 20 of the undercarriage 12 commences rotation about its axis as the wheels 24 and 26 roll along the respective tracks 16 and 18. At these initial lower speeds, the clutch 31, which is a centrifugal clutch, slips at the lower speed when maximum torque is applied. In this manner, the system 10 does not provide any substantial load to the engine (not shown) of the train pulling the train car 14.

As the train accelerates, the clutch 31 gradually engages to couple torque from the end of the axle 20 to the input of the gear box 33. Once the train car 14 has accelerated to a sufficiently high rate of speed, the rotational energy of the axle 20 is transmitted to the gear box 33. At this point, the clutch is fully engaged, and the output of the gear box 33 is connected via the stub shaft 38 to the pair of double gears 35 and 36. In this regard, the gear box 33 is employed to match the speed and torque of the axle 20 to the generator 28. The bevel gears 35 and 36 transmit the rotational energy from the gear box 33 to the stub shaft 34 to the shaft 38 extending at right angles thereto. When the train car 14 decelerates, the reverse operation occurs automatically. Thus, at lower speeds, the system 10 does not tend to load down the operating efficiency of the engine of the train, and only once the train has achieved a relatively high rate of speed, the system 10 becomes operative and the speed and momentum of the train facilitates the operation of the system 10. At such a high rate of speed, there is very little additional load placed on the engine of the train. In this manner, it will become apparent to those skilled in the art that additional similar systems may also be employed on the opposite end of the axle 20, and at the end of other ones of the axles of the undercarriages of the train in a similar manner.

Considering now the system 10 in greater detail with particular reference to FIGS. 1 and 3 of the drawings, the mounting bracket 45 is attached longitudinally and fixedly to a frame portion 46 of the undercarriage 12 extending between the axles 20 and 22. A pair of upper and lower flanges 47 and 49 extend longitudinally along the mounting bracket 45 to support the electrical generator 28 therebetween, a series of straps 52 and 54 fastening the generator 28 in place between the flanges 47 and 49. In this manner, the generator 28 is mounted fixedly in position on the frame portion 46 of the undercarriage 12 so that the electrical generator 28 is shock-mounted thereon and thus rides with the undercarriage 12.

Considering now the clutch 31 in greater detail, the clutch 31, as seen in FIG. 3 of the drawings, is mounted on the end portion of the axle 20 and is an automatic centrifugal clutch. The clutch 31 includes a drive body 56 mounted to the end of the axle 20 to provide for rotation to an inner mechanism assembly (not shown) which is of conventional design and has a plurality of driving blocks (not shown) which are movable radially outwardly when rotated to press frictionally against linings (not shown) mounted on a rim 58 which is connected to the input to the gear box 33.

The drive body 56 has a coupling 60 fixed to the end of the axle 20 in any suitable manner.

Considering now the gear box 33 in greater detail, the gear box is supported by means of an L-shaped support bracket 62 to the frame portion 46 of the undercarriage 12 in a fixed manner. The support bracket 62 has a lower yoke end portion 64 fixedly connected to the housing of the gear box 33 by any suitable technique, such as by welding. An opposite end portion 66 of the support bracket 62 is fixed by any suitable technique, such as by welding, to the frame portion 46 of the undercarriage 12.

The gear box 33 has a gear train (not shown) and provides a suitable transmission between the clutch 31 and the stub shaft 38 so as to match the speed and torque developed by the axle 20 to the charactistics of the desired generator 28.

Thus, the clutch 31 and the gear box 33 provide an outwardly extending assembly mounted on the end of the axle 20 and supported by the support bracket 62. The bevel gears 35 and 36 enable the power to be transmitted from the output of the gear box 33 to the electrical generator 28 extending at right angles to the axis of the axle 20.

While a particular embodiment of the present invention has been disclosed, it is to be understood that very different modifications are possible and are contemplated within the true spirit and scope of the appended claims. For example, in place of the bevel gears 35 and 36 and the rigid shaft 38, a suitable flexible shaft may be employed. There is no intention, therefore, of limitations to the exact abstract or disclosure herein presented.

The embodiments of the invention in which an exclusive property or privilege is claimed are defined as follows:

1. In a vehicular energy producing system, said system including an electrical generating means and being adapted to be mounted on a heavy vehicle having at least one undercarriage, the undercarriage having at least one axle journaled for rotation about its ends, a plurality of wheels being connected to the axle for helping support rollably the undercarriage, the combination comprising: bracket means mounted on the undercarriage for supporting said electrical generating means; transmission means for coupling drivingly the input of said generating means and the undercarriage for driving said generating means as the vehicle moves; conductor means for supplying said electrical power from said generating means for utilization purposes; clutch means responsive to the rotation of the wheels of the undercarriage for coupling mechanical power drivingly to said transmission means; said clutch means including a centrifugal clutch for slipping at lower speeds of the wheels and for engaging automatically at higher speeds of the wheels.

2. In a vehicular energy producing system, the combination according to claim 1, wherein said bracket means includes a pair of flanges for supporting said generator means therebetween, and a plurality of members for fixing said generator means in position on a frame portion of the undercarriage.

3. In a vehicular energy producing system, the combination according to claim 1, further including a brush conductor connecting electrically the output of said generator means and a stationary power take-off conductor rail, said conductor rail being composed of electrically conductive material.

4. In a vehicular energy producing system, the combination according to claim 1, wherein said clutch includes a drive body having a coupling fixed to the end portion of the axle and having a rim.

5. In a vehicular energy producing system, the combination according to claim 4, wherein said transmission means includes a gear box having its input connected to said rim of said clutch, said transmission means and said gear box forming a unit extending axially outwardly from said axle.

6. In a vehicular energy producing system, the combination according to claim 5, wherein said transmission further includes a first shaft connected to the output of the gear box and extending co-axially relative to the axle.

7. In a vehicular energy producing system, the combination according to claim 6, wherein said transmission further includes a second shaft connected to the input of said generator means, a pair of bevel gears connecting drivingly said first shaft to said second shaft, said first and said second shafts extending substantially at right angles relative to one another.

8. In a vehicular energy producing system, the combination according to claim 7, further including a brush conductor connecting electrically the output of said generator means and a stationary power take-off conductor rail, said conductor rail being composed of electrically conductive material.

* * * * *